United States Patent [19]
Tauer

[11] Patent Number: 6,089,817
[45] Date of Patent: Jul. 18, 2000

[54] WHEELCHAIR LIFT WITH SINGLE LIFTING MECHANISM

[76] Inventor: Kenneth Tauer, 9801 Robin Oak Rd., Minnetonka, Minn. 55305

[21] Appl. No.: 09/034,280

[22] Filed: Mar. 4, 1998

[51] Int. Cl.[7] ...................................................... B60P 1/44
[52] U.S. Cl. ............................................ 414/558; 414/921
[58] Field of Search ...................... 414/558, 917, 414/921, 540, 545, 546

[56] References Cited

U.S. PATENT DOCUMENTS

| | | | |
|---|---|---|---|
| 3,263,835 | 8/1966 | Lugash | 414/558 |
| 3,893,576 | 7/1975 | Casady | 414/921 X |
| 4,124,130 | 11/1978 | Rohrs et al. | 414/921 X |
| 4,134,504 | 1/1979 | Salas et al. | 414/558 |
| 4,711,613 | 12/1987 | Fretwell | 414/921 X |
| 4,958,979 | 9/1990 | Svensson | 414/921 X |
| 5,040,936 | 8/1991 | Rhea | 414/921 X |
| 5,253,973 | 10/1993 | Fretwell | 414/558 |
| 5,542,811 | 8/1996 | Vartanian | 414/921 X |
| 5,556,250 | 9/1996 | Fretwell et al. | 414/921 X |

*Primary Examiner*—Janice L. Krizek
*Attorney, Agent, or Firm*—Jacobson & Johnson

[57] ABSTRACT

A wheelchair lift having a single piston and cylinder mechanism for both raising and lowering the wheelchair lift and for pushing the wheelchair lift out to an operating configuration from underneath the vehicle and pulling the wheelchair lift back to a storage configuration underneath the vehicle. The wheelchair lift includes a lift mechanism having a first arm hingedly engaged to a wheelchair platform and a second arm hingedly engaged to a base. The single piston and cylinder mechanism draws these first and second arms up and down into operating and storage positions. A third arm is pivotally engaged between the first and second arms and a fourth arm is pivotally engaged between the platform and the base. The third and fourth arms swing parallel to each other to raise and lower the platform. The lift further includes a lock for locking the platform to the base for storage. The lift still further includes a safety roll stop for the edge of the wheelchair platform where the wheelchair rolls on to and off the platform.

14 Claims, 14 Drawing Sheets

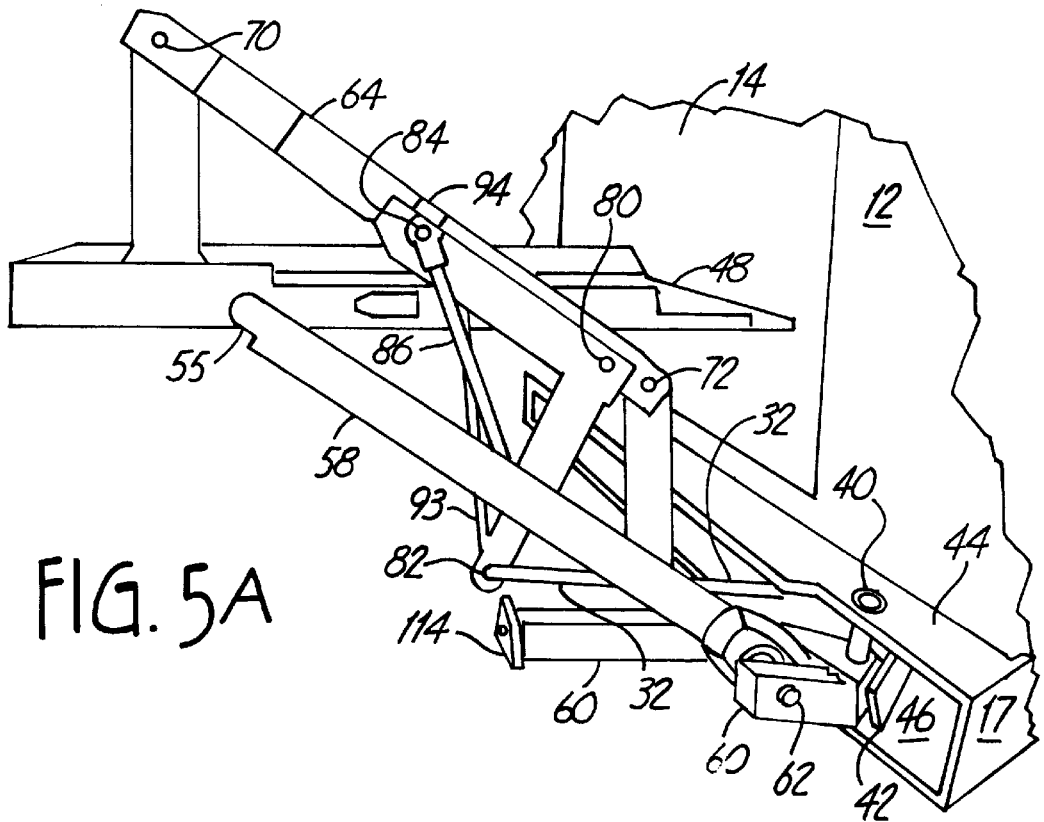

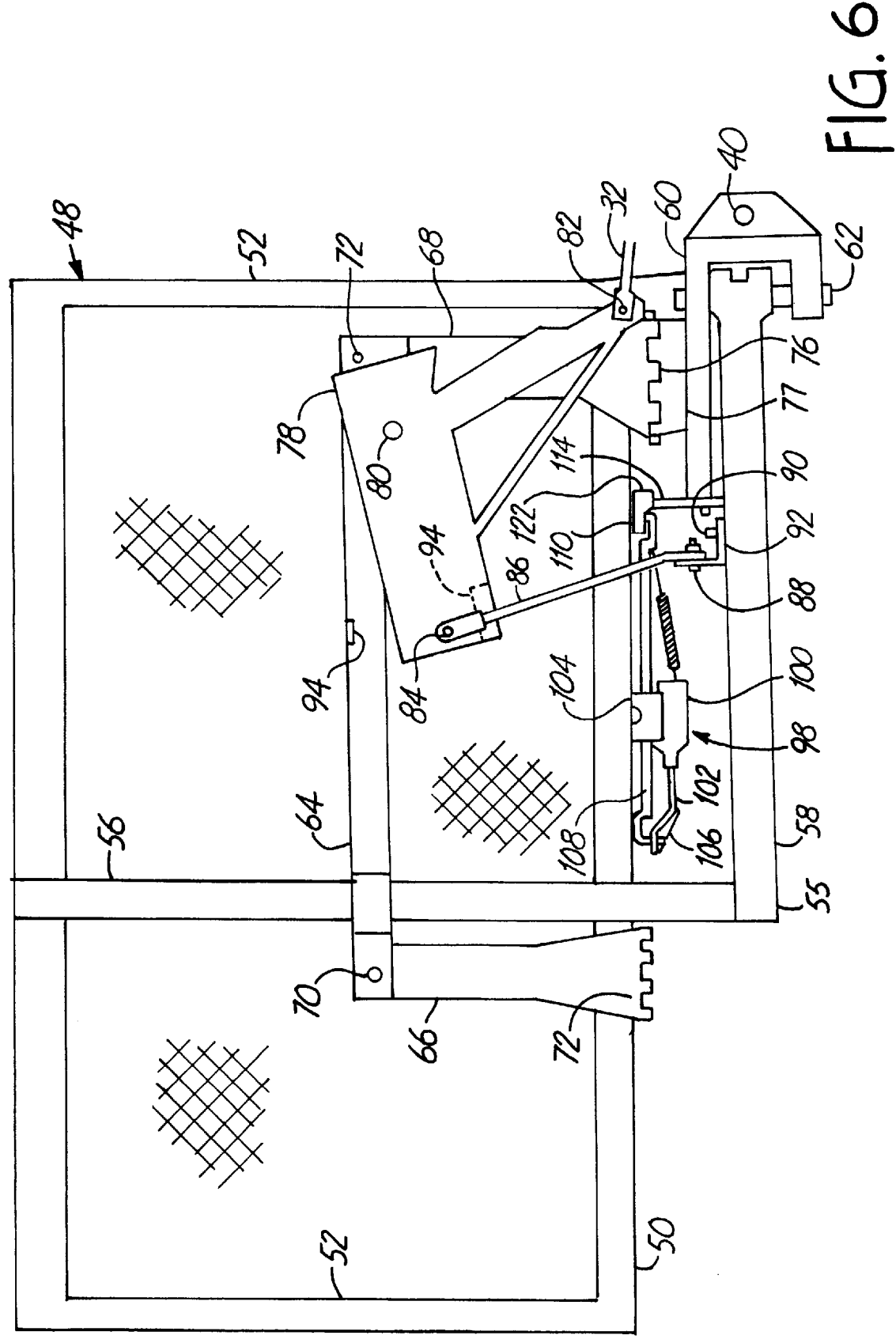

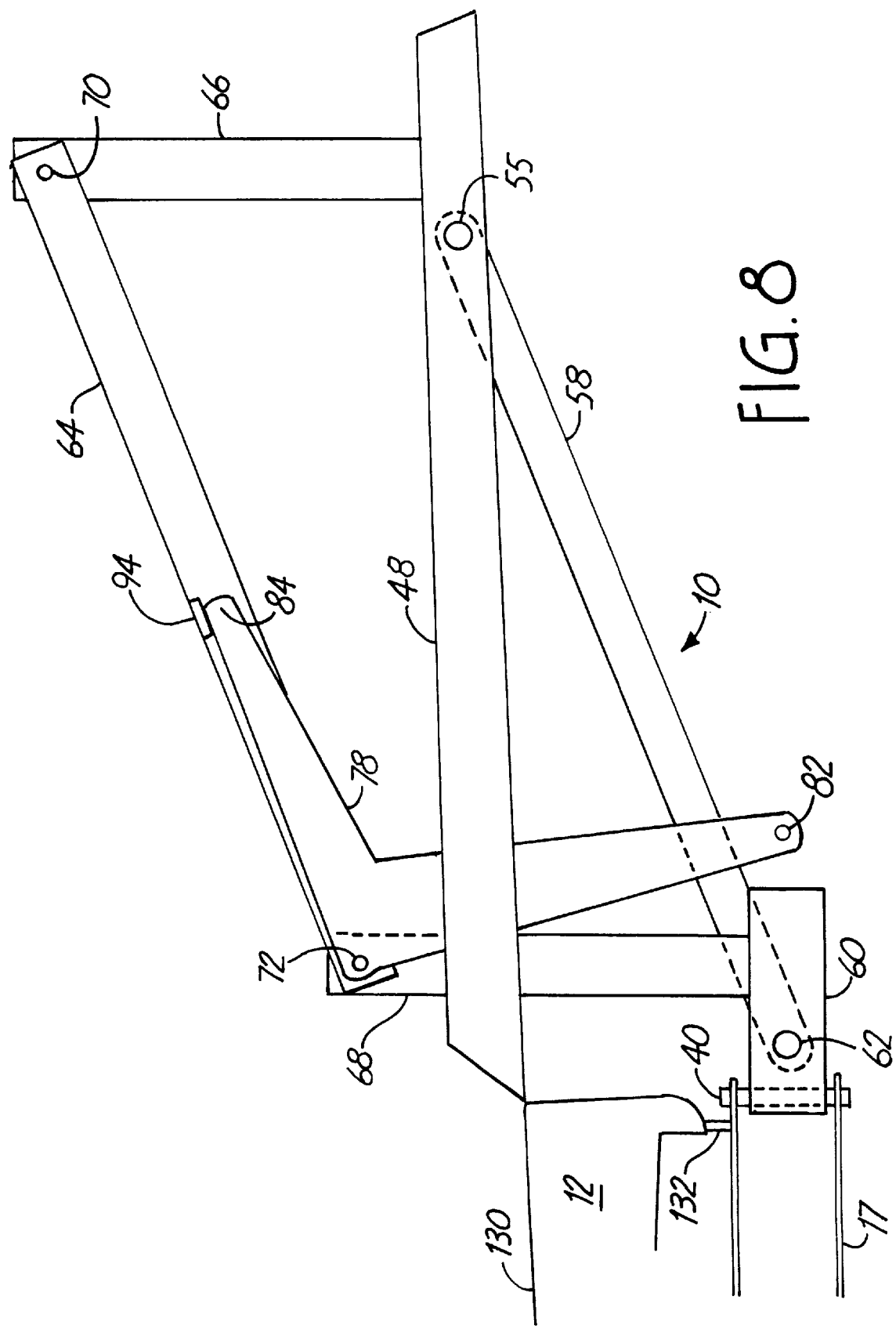

WHEELCHAIR LIFT WITH SINGLE LIFTING MECHANISM

FIELD OF THE INVENTION

The present invention relates generally to wheelchair lifts and more specifically to under-vehicle wheelchair lifts operated by a single linear actuator mechanism.

BACKGROUND OF THE INVENTION

Self reliance for one who uses a wheelchair comes with a price. For example, a van provides a number of advantages over a two door or four door car, but a van is expensive. A modified van is even more expensive, since such a van may have accessories—or necessities—such as a wheelchair lift that contributes to the high cost of the modified van. One costly component of a wheelchair lift is the power mechanism or power mechanisms used to move the lift out from a stored position to an operating position, then to raise and lower the lift, and then to move the lift from the operating position back to the stored position.

For the modified van, an under vehicle lift (UVL) is most desired because it takes up no interior van space. Interior van space is at a premium even for families without a member in a wheelchair.

The purpose of a lift on a vehicle such as a van is to safely raise a person and wheelchair from ground level to the level of the floor of the van, where the person then wheels into the van. Then the lift is stored for travel to a destination, whereupon the lift is moved out to safely carry the person and the wheelchair from the van to the ground

SUMMARY OF THE INVENTION

The present invention includes an under vehicle lift that uses a single linear actuator to swing the lift out from underneath the vehicle for use, to raise or lower the lift to raise or lower the person and wheelchair, and to swing the lift back to its stored position underneath the vehicle.

The invention includes a lift mechanism that is drawable onto and away from the platform for the wheelchair. In its stored position, the lift mechanism lies generally flat on the platform. In its operating position, the lift mechanism has swung up and away from the platform. Such swinging is provided for by one side arm which is hingedly engaged to the wheelchair platform and by another side arm which is hingedly engaged to a base for the lift.

The lift mechanism includes at least four pivot points which define a parallelogram. Two of the pivot points lie on upper portions of the swingable arms which are hingedly engaged to the platform and wheelchair platform respectively and which have a third parallel arm engaged therebetween. The other two pivot points are found on a fourth parallel support arm, one end of which is pivotally engaged to the platform and the other end of which is pivotally engaged to the base. The parallel arms run parallel to each other during the raising and lowering of the lift.

The lift mechanism further includes an arm fold link that is pivotally engaged to the linear actuator and that is further pivotally engaged to the parallel arms of the lift mechanism. The arm fold link draws the lift mechanism from its folded position on the wheelchair platform up to its operating position. The arm fold link further, somewhat like a scissors mechanism or more closely like half of a scissors mechanism, draws the parallel arms up and down to raise and lower the lift The lift mechanism still further includes a safety roll stop or bar on the edge of the wheelchair platform where the wheelchair rolls on and off the ground. The safety roll bar is controlled by a pivoting lever, a distal end of which is biased outwardly, such as by a linear actuator, toward the ground and which swings inwardly when the wheelchair platform hits the ground. A proximal end of the pivoting lever includes a roller to engage a surface of the safety roll bar. When the distal end of the pivoting lever is raised up by contact with the ground, the proximal end of the pivoting lever swings downwardly, permitting the safety roll bar to swing to a lowered position. When the wheelchair platform is raised off the ground, the safety roll bar is swung upright by the roller running across and against the bar This upward running of the roller occurs when the distal end of the pivoting lever is pushed downwardly by the linear actuator, which automatically occurs when the wheelchair platform is raised and the pivoting lever is disengaged from the ground. When swing upright, the safety roll bar locks, via a combination of hinged bar portions and a support arm, to the wheelchair platform to serve as a stop to prevent a wheelchair from rolling off the platform.

An advantage of the present wheelchair lift is that it is relatively inexpensive. Only a single linear actuator, such as a single piston and cylinder mechanism, is used to both 1) swing the lift out from its stored position to its operating position and 2) raise and lower the lift.

Another advantage of the present wheelchair lift is that it is easy and inexpensive to install. The lift is sufficiently compact so as to fit between the dive shaft and the edge of the van and out of the way of the gas tank. Since the wheelchair lift stays to one side of the drive shaft, is advantageously bolted directly to the underside of the vehicle instead of being dangerously suspended at a low position below the drive shaft Other advantages of the present wheelchair lift are that it is safe, easy to operate, fast, energy efficient, and requires little maintenance.

BRIEF DESCRIPTION OF THE DRAWINGS

FIG. 5A shows a perspective view of the present wheelchair lift in a raised position at about the height of the floor of a van.

FIG. 5B shows a perspective view of the wheelchair lift of FIG. 5A in a position where the hinged side arms have just been swung up from a storage position or are in position to be swing down to a storage position.

FIG. 6 shows a top view of the present wheelchair lift where the hinged side arms have just been swung down to the storage position or are in position to swing up to an operating position.

FIG. 8 shows a schematic view of a slightly different embodiment of the present wheelchair lift.

DESCRIPTION OF THE PREFERRED EMBODIMENTS

Figure 1A:
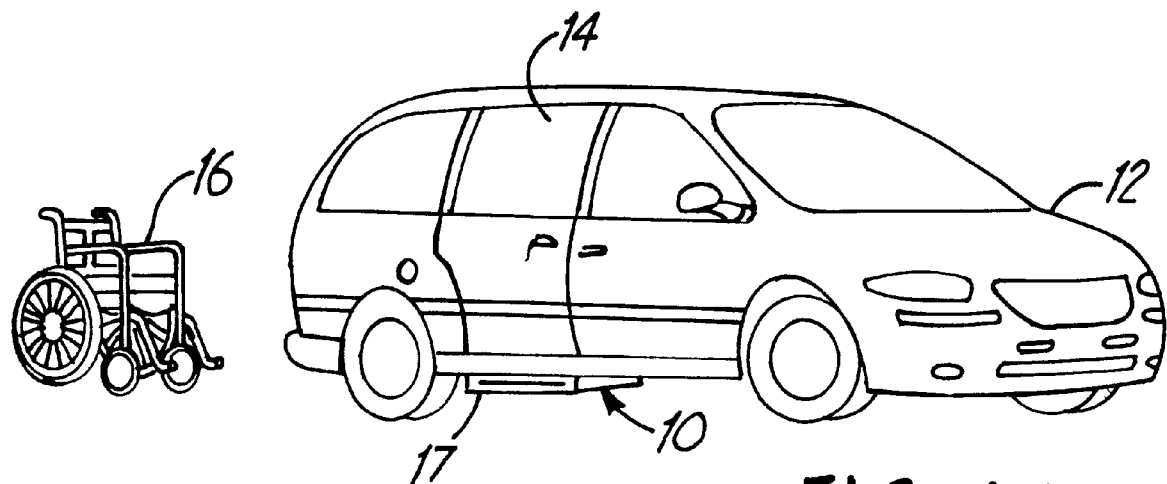
FIG. 1A shows a perspective view of a van having the present wheelchair lift bolted to its underside and further shows in perspective a wheelchair.

As indicated in FIG. 1A, the present wheelchair lift 10 is bolted to a van 12 directly beneath a sliding door 14. A wheelchair 16 is shown next to the van 12. Reference numeral 17 indicates a box like receptacle or base for the wheelchair lift 10.

Figure 1B:
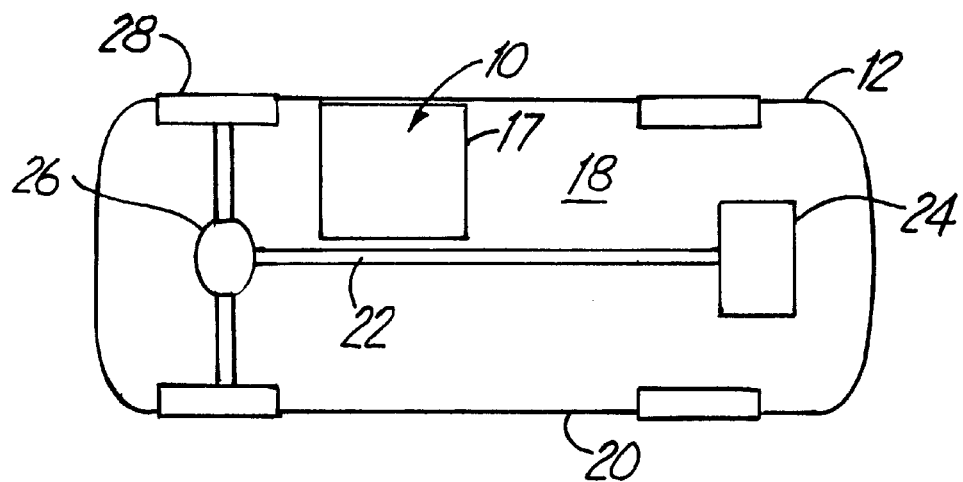
FIG. 1B shows a schematic view of the underside of the van of FIG. 1 having the present wheelchair lift bolted to the underside of the van between the edge of the van and the drive shaft.

As indicated schematically in FIG. 1B, receptacle or base 17 for wheelchair lift 10 is rigidly fixed, such as with bolts, to an underside 18 of van 12. Base 17 fits generally between an edge 20 of van 12 (or just beyond edge 20) and a driveshaft 22 of van 12. Van 12 includes an engine 24, differential 26, and wheels 28.

Figure 2A:
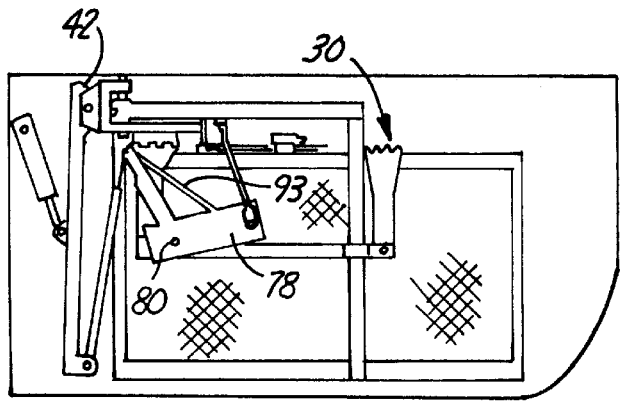
FIG. 2A shows a cut away top view of the present wheelchair lift stored fully in its receptacle.
Figure 2B:
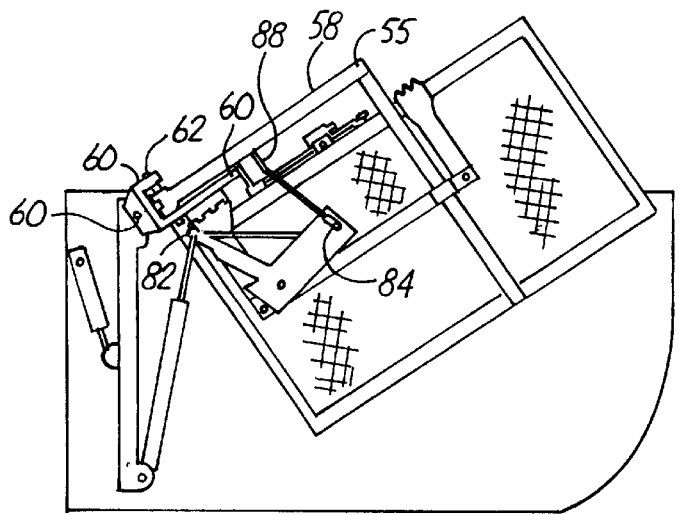
FIG. 2B shows a cut away top view of the lift of FIG. 2A swinging out from the receptacle.
Figure 2C:
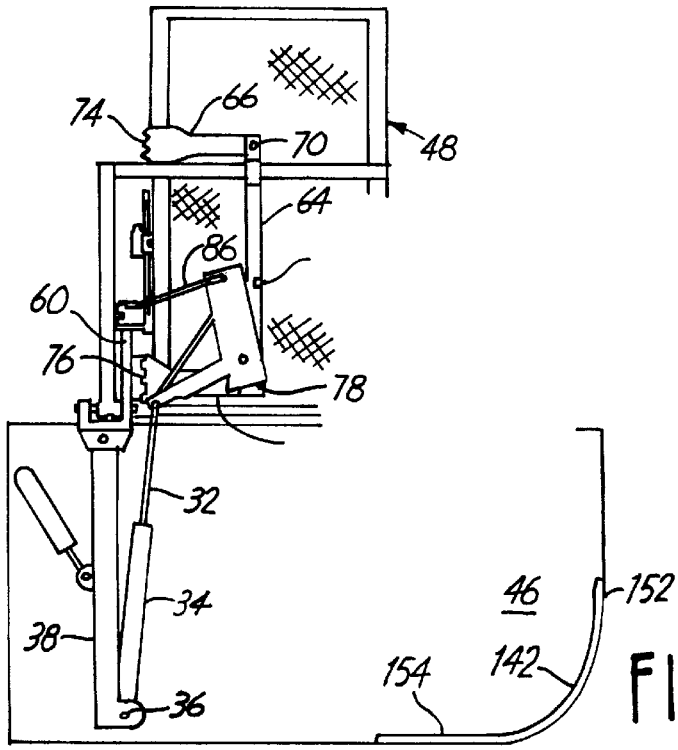
FIG. 2C shows a cut away top view of the lift of FIG. 2A with the lift being fully drawn out of the receptacle, with the lift mechanism stored on top of the wheelchair platform.
Figure 2D:
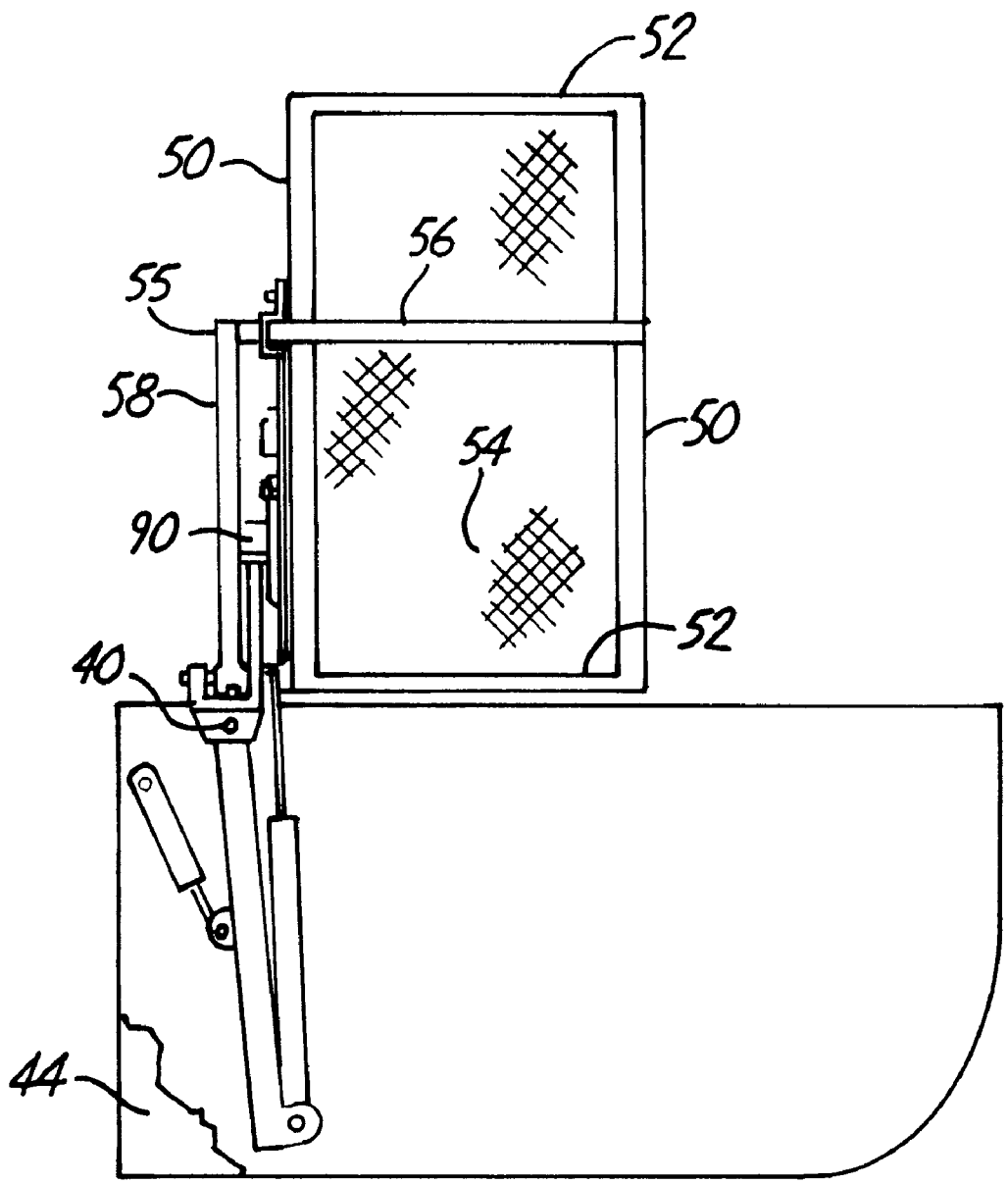
FIG. 2D shows a cut away top view of the lift of FIG. 2A with the lift being fully drawn out of the receptacle, with the lift mechanism swung up to its operating position to raise and lower the platform.

FIGS. 2A, 2B, 2C and 2D indicate the swinging of a lift mechanism 30 out of housing 17 via a main pivot 40. FIG. 2A shows the lift mechanism 30 fully stored. FIG. 2B shows the lift mechanism 30 partially being swung out. FIG. 2C shows the lift mechanism 30 swung out to a first operating position, but with a portion of the lift mechanism 30 still in a storage configuration. FIG. 2D shows the lift mechanism 30 in a fully operational state.

As indicated in FIGS. 2A, 2B, 2C, 2D, 6 and 7 lift mechanism 30 includes, in part, a first linear actuator or hydraulic piston and cylinder mechanism which includes a piston 32 extendible out of and retractable into a cylinder 34. At one end, cylinder 34 is pivotally fixed via a pivot pin 36 to an end of pivotable beam 38 Pivotable beam 38 is pivotally engaged at its other end to the main pivot 40. At such end, pivotable beam 38 includes a rotation stop or abutment 42. Main pivot 40 is journaled to upper and lower plates 44 and 46 of the box like base 17.

As further shown in FIGS. 2A, 2B, 2C, 2D, 6 and 7, lift mechanism 30 further includes a wheelchair platform 48. Wheelchair platform 48 includes, to form its perimeter, a pair of side angle irons 50 of and a pair of end bars 52. A rigid grid 54 is fixed to and between the angle irons 50 and bars 52. The wheelchair platform 48 further includes a rigid metal piece 56 traversing the angle irons 50 and rigidly affixed, such as by welding, to and between the angle irons 50 and beyond one angle iron 50.

Pivotally engaged, via a pivot point or pin 55, to the rigid metal piece 56is an end of a master support arm 58. At its other end, the master support arm 58 is pivotally engaged to a clevis beam 60 via a pivot pin or point 62. Clevis beam 60 is pivotally engaged, via main pivot 40, to the housing or base 17. Clevis beam 60 and its main pivot pin 40 are preferably considered to be a portion of the base 17.

FIGS. 2A, 2B, 2C, 2D, 6 and 7 further show a top parallel arm 64, and hinged or folding arms is 66 and 68. At one of its ends, top parallel arm 64 is pivotally engaged to hinged arm 66 via pivot pin or point 70. At the other of its ends, top parallel arm 64 is pivotally engaged to hinged arm 68 via pivot pin or point 72. Hinged arm 66 is, opposite of pivot point 70, hingedly engaged, via hinge 74, to one angle iron 50 of the wheelchair platform 48. Hinged arm 68 is, opposite of pivot point 72, hingedly engaged, via hinge 76, to clevis beam 60. Clevis beam 60 includes an extension or metal piece 77 to properly position hinge 76 and to which hinge 76 is welded.

As further indicated in FIGS. 2A, 2B, 2C, 2D, 6 and 7, the lift mechanism 30 includes an arm fold link 78. Arm fold link 78 is generally a V-shaped piece that, at a base portion or apex of the V, is pivotally affixed via a pivot pin or point 80 to top parallel bar 64. One end of the V-shaped arm fold link 78 is pivotally engaged, via pivot pin or point 82, to a distal end of piston 32. The other end of the V-shaped arm fold link 78 is pivotally engaged, via pivot pin or point 84, to one end of an arm fold linkage 86. The other end of the arm fold arm linkage 86 is pivotally engaged twice, via pivot pins 88 and 90, to the master support arm 58, as best shown in FIG. 6. Arm fold linkage 86 includes an angle iron 92 engaging the pivot pins 88 and 90. Arm fold linkage 86 pivots about pivot pin 88 when the arm fold link 78 is swinging between the storage position (as shown in FIG. 2C) and the operating position (as shown in FIG. 2D). Arm fold linkage 86 pivots about pivot pin 90 when the arm fold link 78 is operating the top parallel arm 64 and master support arm 58 to raise and lower the lift mechanism 30. Arm fold link 78 includes a rigid support 93 running between two arm portions of the arm fold link 78. Pivot pins 88 and 90 may be replaced by a universal joint.

It should be noted that the axis of pivot pin or point 88 runs generally parallel to the master support arm 58 and to the top parallel arm 64. It should further be noted that the axes of pivot pin or points 55, 62, 70, 72, 80, 82, 84, and 90 are generally parallel to each other when the lift mechanism 30 is in its operating position as shown in FIG. 2D. It should further be noted that the axes of pivot pins 55, 62, 70, and 72 run through the corners of a parallelogram and that the axes of pivot pins 84 and 90 are also on such parallelogram when the lift mechanism 30 is in its operating position.

Figure 4A:
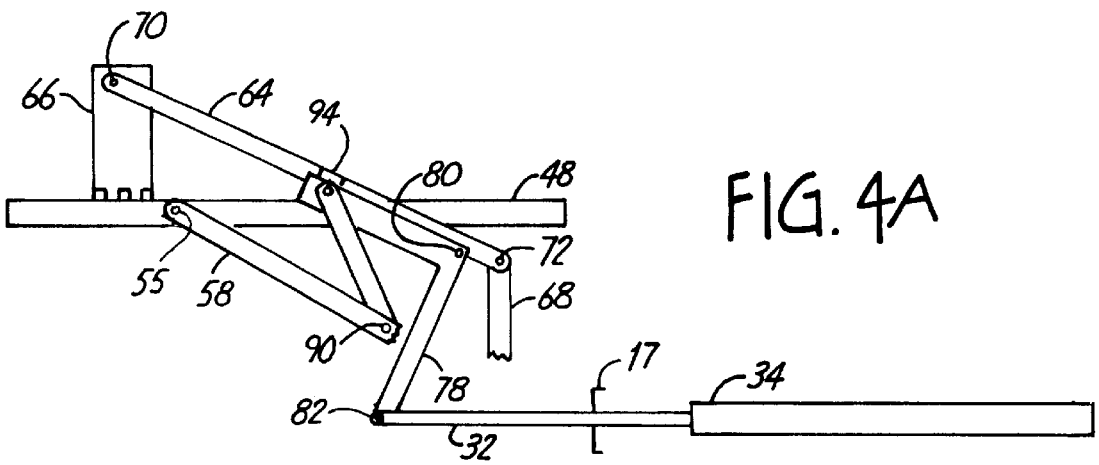
FIG. 4A shows a schematic view of the parallel arms and hinged upright arms of the present lift being operated by a piston and arm fold link to raise the wheelchair platform to a relatively high position, such as to a van floor.
Figure 4B:
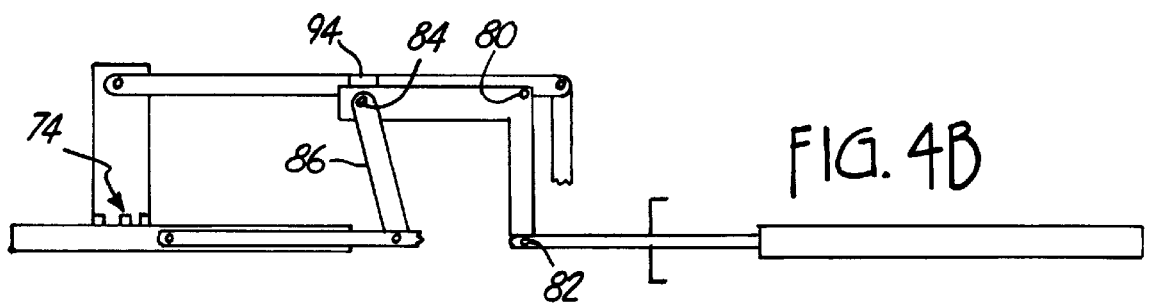
FIG. 4B shows a schematic view of the parallel arms and hinged upright arms being operated by the piston and arm fold link of FIG. 4A to raise the wheelchair platform to a medial position, such as to a storage position where one of the parallel arms is in generally a common plane with the wheelchair platform.
Figure 4C:
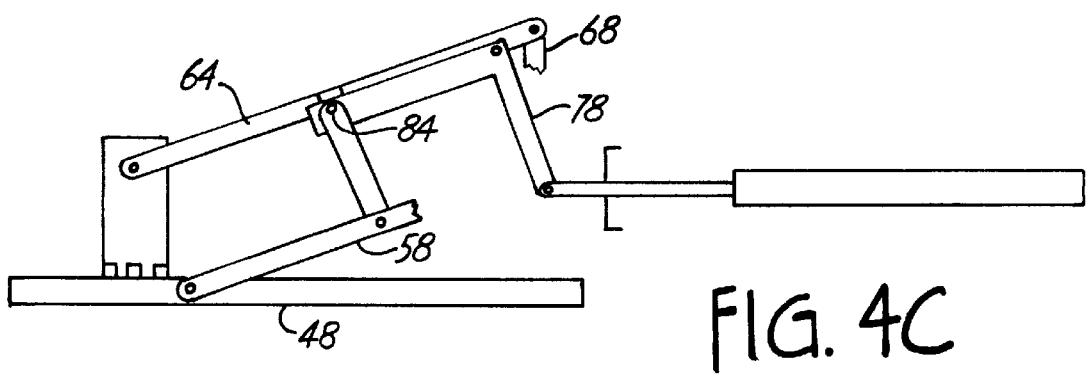
FIG. 4C shows a schematic view of the parallel arms and hinged upright arms being operated by a piston and arm fold link of FIG. 4A to lower the wheelchair platform to a relatively low position, such as to the ground
Figure 7:
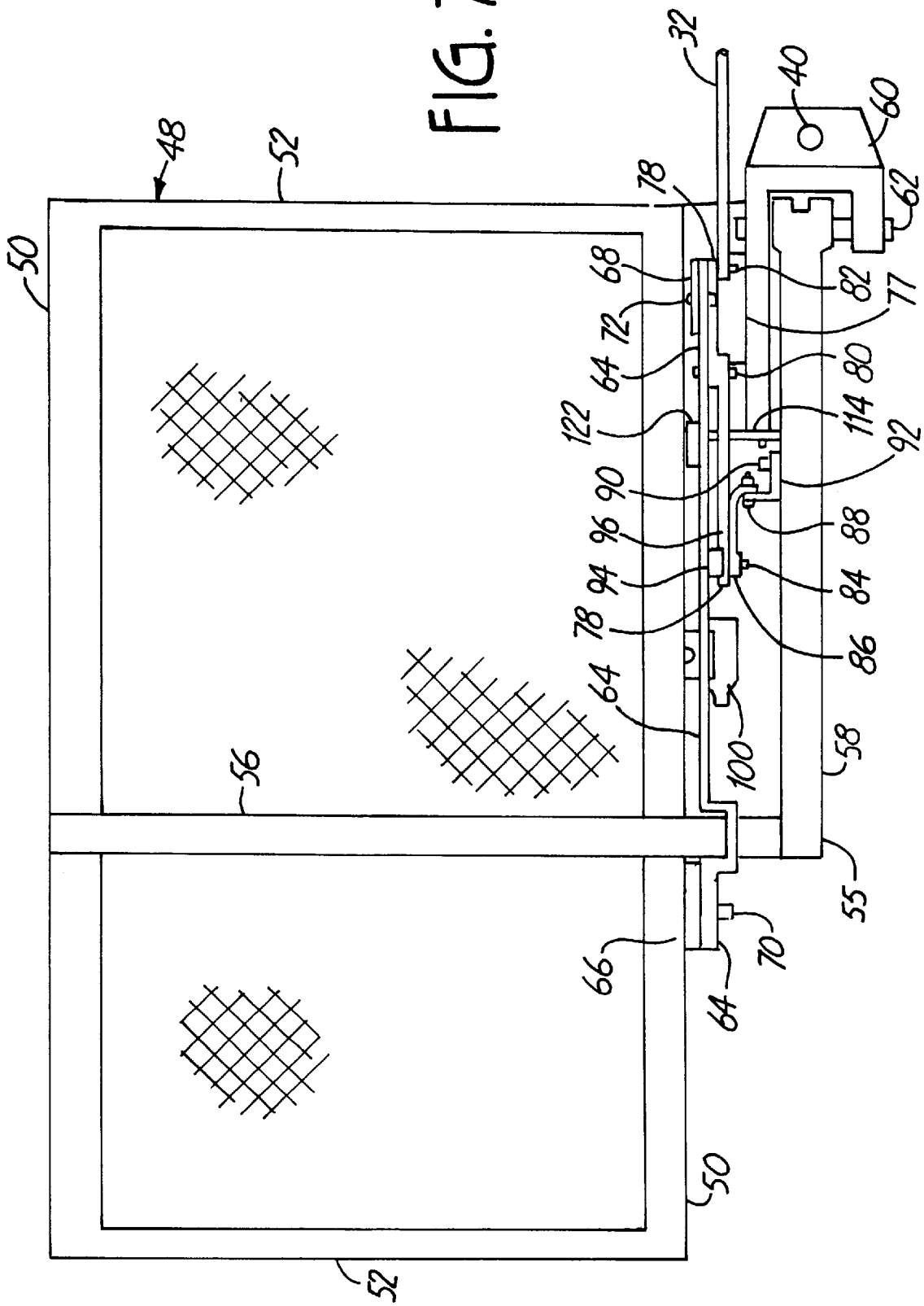
FIG. 7 shows a top view of the present wheelchair lift where the lift mechanism having the hinged side arms, parallel arms, and arm fold link is in an operating position.

As further shown in FIGS. 2A, 2B, 2C, 2D, 6 and 7, and as also shown in FIGS. 4A, 4B, and 4C, top parallel arm 64 includes a stop 94 rigidly affixed to the top parallel arm 64. An upper edge 96 of the arm fold link 78 brings pressure to bear on the stop 94 when the arm fold link 78 raises the top parallel arm 64, and the top parallel arm 64, through the stop 94, rings pressure to bear on the arm fold link 78 which is drawn in by the piston 32.

Figure 9A:
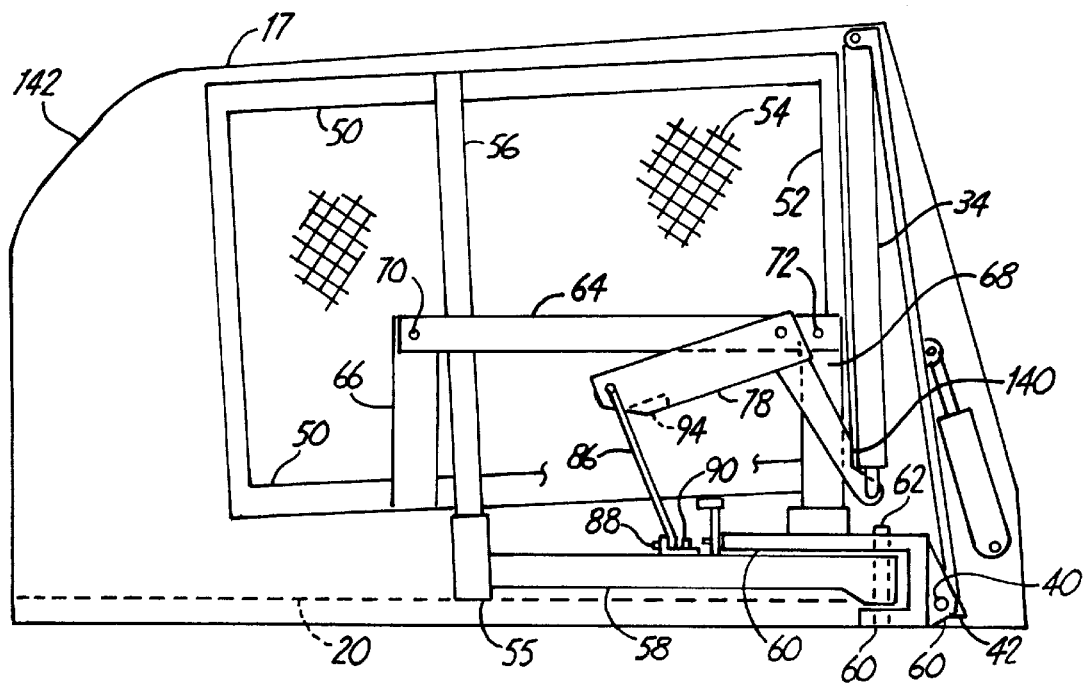
FIG. 9A shows a top cut away view of the present wheelchair lift in its fully stored position in its receptacle.

It should be noted that the preferred location for the stop 94 is on the inner side of the arm fold link 78 itself, as shown in phantom in FIGS. 6 and 9A. Welded to such a location, the stop 94 brings pressure to bear on the bottom edge of top parallel arm 64.

Figure 3A:
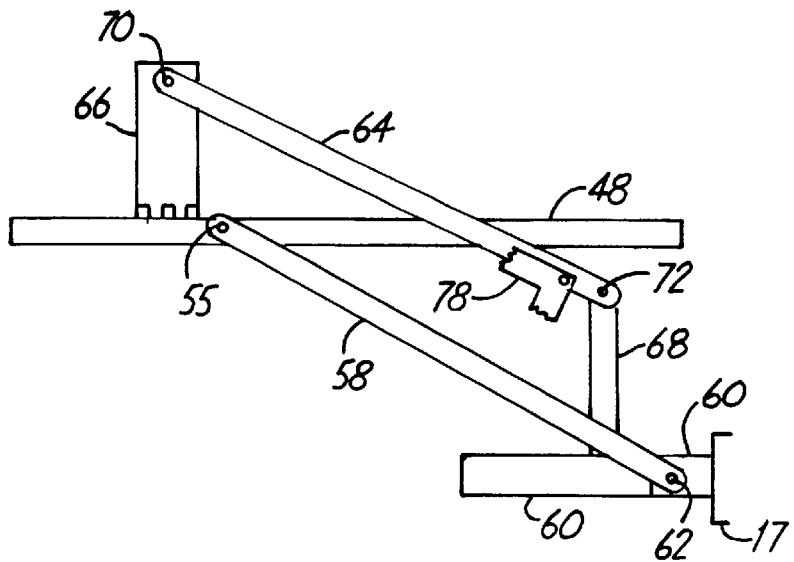
FIG. 3A shows a schematic view of the parallel arms and hinged upright arms of the present lift raising the wheelchair platform to a relatively high position, such as to a van floor.
Figure 3B:
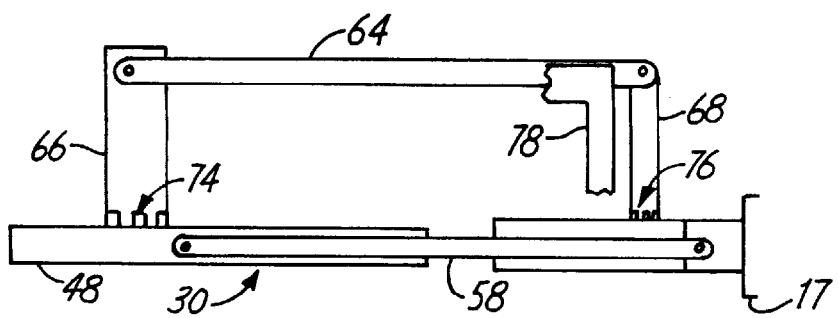
FIG. 3B shows a schematic view of the parallel arms and hinged upright arms of the lift of FIG. 3A raising the wheelchair platform to a medial position, such as to a storage position where one of the parallel arms is in generally a common plane with the wheelchair platform.
Figure 3C:
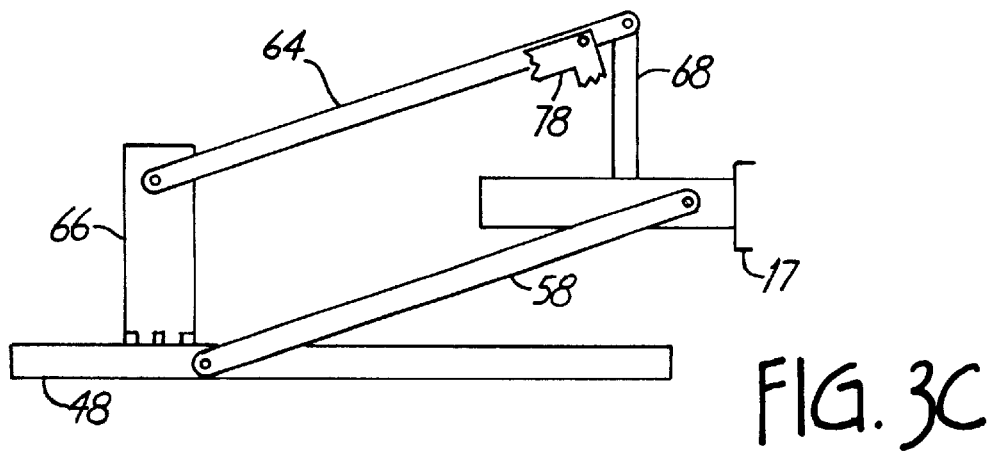
FIG. 3C shows a schematic view of the parallel arms and hinged upright arms of the lift of FIG. 3A lowering the wheelchair platform to a relatively low position, such as to the ground.

FIGS. 3A, 3B and 3C show the wheelchair platform 48 being raised and lowered through the operation of the top parallel arm 64 and its accompanying parallel arm, the master support arm 58. Arm fold link 78 is broken away for clarity. FIG. 3B indicates the position where the hinged arms 66 and 68 are hingedly folded or collapsed via their respective hinges 74 and 76 onto the wheelchair platform 48 for storing the lift mechanism 30.

FIGS. 4A, 4B and 4C also show the wheelchair platform 48 being raised and lowered, and include the arm fold link 78 and piston 32 and its cylinder 34. Clevis beam 60 is not shown and a portion of hinged arm 68 is broken away for clarity. As indicated by the FIGS. 4A, 4B and 4C, piston 32 and arm fold link 78 work generally like a scissors mechanism or half of a scissors mechanism, with an acute angle being formed between piston 32 and arm fold link 78 in FIG. 4A, a generally right angle in FIG. 4B, and an obtuse angle in FIG. 4C.

FIGS. 4A, 4B and 4C also indicate that when the piston 32 is extended, the wheelchair platform 48 is raised, and when the piston 32 is retracted, the wheelchair platform 48 is lowered. It should be noted that when the wheelchair platform 48 is raised, arm fold link 78, though its arm fold linkage 86, applies a lifting pressure to the master support arm 58 such that the piston 32 and its cylinder 34 apply a lifting pressure to both the top parallel arm 64 (through stop 94) and the master support arm 58 (through arm fold linkage 86).

FIGS. 5A and 5B show the lift mechanism 30 in perspective and in greater detail. In FIG. 5B, a portion of the arm fold linkage 86, running to the master support arm 58, is broken away for clarity to show a lock mechanism 98 for locking the wheelchair platform 48 to the master support arm 58.

As indicated in FIGS. 5A, 5B, 6 and 9B, lock mechanism 98 includes a solenoid or switch 100 having a wire 102 which is pulled when the solenoid or switch 100 is closed. The solenoid 100 is fixed to angle iron 50 of one side of the wheelchair platform 48 via a bracket 104. Wire 102 is pivotally engaged to a lower end of a first pivot arm 106 which is pivotally engaged to said angle iron 50. An upper end of pivot arm 106 is pivotally engaged to one end of a rod 108 which runs in the direction of said angle iron 50. The other end of the rod 108 is pivotally engaged to an upper end of a second pivot arm 110 which is pivotally engaged to said angle iron 50. A lower end of the second pivot arm 110 includes a pin 111 which pivotally engages an end of a coil spring 112. The other end of the coil spring 112 is fixed to the housing of the solenoid 100.

Figure 9B:
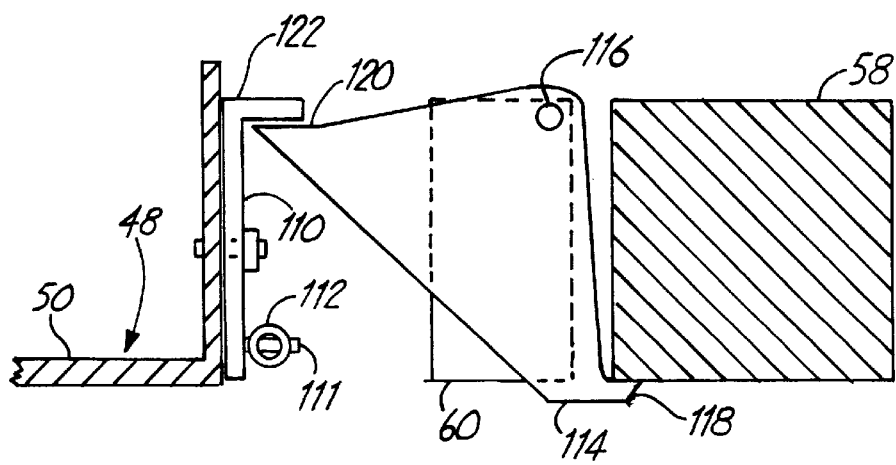
FIG. 9B shows a locking mechanism for the wheelchair lift of FIG. 9B to maintain the platform of the lift and a master support arm of the lift in generally a common plane for storage.

As indicated in FIG. 9B, lock mechanism 98 further includes a lock 114 pivotally engaged via pin 116 to clevis beam 60. Lock 114 includes a first integral lip 118 for engaging an underside of master support arm 55 and a second integral lip 120 for engaging an integral extension or trigger portion 122 of pivot arm 110. Lock 114 locks or maintains the master support arm 55 and wheelchair platform 48 in generally a common plane with clevis beam 60. The wheelchair lift 10 is in its stored position in base 17 for periods of time that are far greater than when the wheelchair lift 10 is in operation. Accordingly, solenoid 100 is normally open and the coil spring 122 normally draws the trigger portion 122 over lip 120 of lock 114. In operation, solenoid 100 is closed to draw in wire 102, which through pivot arm 106, shaft 108, draws the trigger portion 122 away from lip 120 of lock 114, which permits the lock 114 to pivot under the influence of gravity (and proper location of pin 116 and proper design of the center of gravity for lock 114) such that lip 114 swings away from engagement with the underside of master support arm 55. Such a disengagement permits master support arm 55 and wheelchair platform 48 to swing relatively past each other.

It should be noted that to lock the lock 114, the piston 32 is operated to raise the wheelchair platform 48 to a position above the lock 114. Then the solenoid 100 is opened to permit the coil spring 122 to draw the trigger portion 122 over lip 120, and the wheelchair platform 48 is slowly lowered to permit the trigger portion 122 to bring pressure to bear on lip 120, which in turn brings pressure to bear between lip 114 and master parallel arm 58 to lock the lift mechanism 30.

In the locked configuration as shown in FIG. 9B, the single piston 32 can move the parallel arms 58 and 64 up but not down below the plane of the base. Retraction of the piston 32 results in the lift mechanism 30 being drawn on top of the wheelchair platform 48. Such a folding action is enhanced by locating pivot 88 at a higher level than either of the hinges 74 or 76. Further retraction draws the lift mechanism 30 back into base 17. To push out the lift mechanism 30 to an operating position, the operation is reversed. The piston 32 is simply extended until rotation about pin 40 brings clevis beam 60 into contact with stop 42. Rotation about pin 40 thus ceases, but extension of piston 32 continues and it is a this point in time that the lift mechanism 30 is raised via hinges 74 and 76. Here extension of piston 32 raises platform and removes pressure between lock 114 and 122. Solenoid 100 is operated to unlock lock 114. When the lock 114 is unlocked, the piston 32 may be retracted to lower the wheelchair platform 48. Alternately, a normally unlocked mechanism 123 could be used, activating the solenoid only to draw mechanism 30 to the platform, then relying on weight of platform to hold lock 122 engaged.

FIG. 8 indicates a schematic view of a slightly different embodiment of the present wheelchair lift 10. In this embodiment the arm fold link 78 is disposed on the inner side of the top parallel arm 64 so as to be between the top parallel arm 64 and wheelchair lift 48, whereas in the preferred embodiment the arm fold link 78 is on the outer side of the top parallel arm 64. Further in this embodiment shown in FIG. 8, stop 94 is fixed to the inner side of top parallel arm 64.

FIG. 8 further indicates that the lift 10 is raised such that a floor 130 of the van 12 lies generally in a common plane with the grid 54 of the wheelchair platform 48. FIG. 8 further indicates schematically a bolt 132 between the housing 17 and van 12.

FIG. 9A shows how the lift 10 may lie in a generally flat stored configuration. In such a configuration, it should be noted that side hinged arm 68 includes a notch 140 to receive a position of the cylinder 34 to permit the side arm 68, and lift mechanism 30 as a whole, to more fully slide into the base 17. In the stored configuration, one of the bars 52 of the frame of the wheelchair platform 48 lies adjacent and parallel to cylinder 34.

As further shown in FIG. 9A, it should be noted that a portion 142 of the housing 17 is rounded to as to minimize the space required for base 17.

Figure 10A:
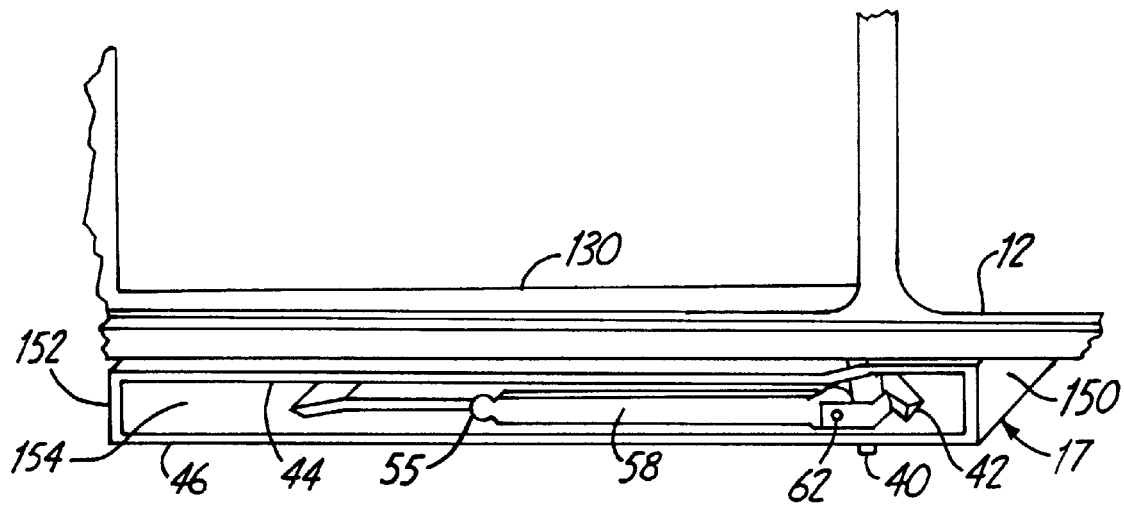
FIG. 10A shows a perspective somewhat detailed view of the present wheelchair lift bolted to the underside of a van.
Figure 10B:
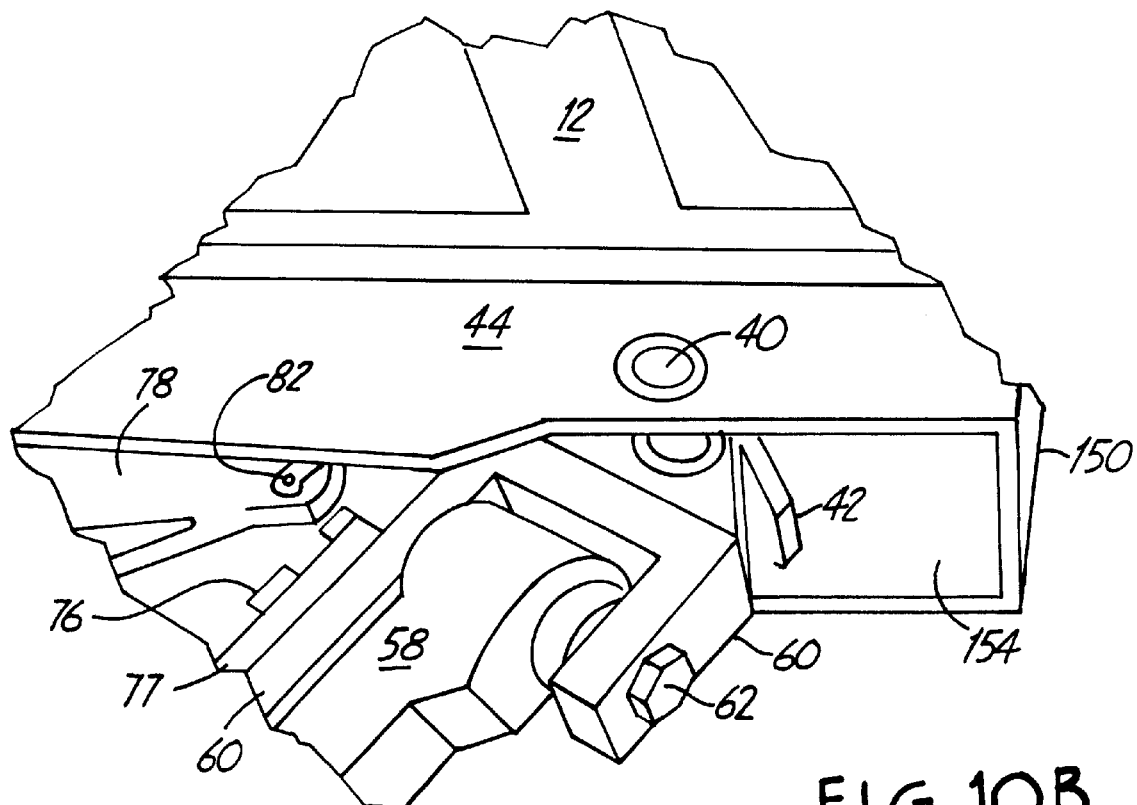
FIG. 10B shows a perspective detail view of the stop for the master support arm of the present wheelchair lift.

FIG. 10A is a perspective view of the lift mechanism 30 stored in the base 17. Base 17 is box like and includes the upper planar ceiling 44, the lower planar floor 46, planar sidewalls 150, 152, and curved sidewall portion 142. Base 17 is one-piece. Base 17 includes an opening 154 through which lift mechanism 30 is drawn in and out.

Figure 11:
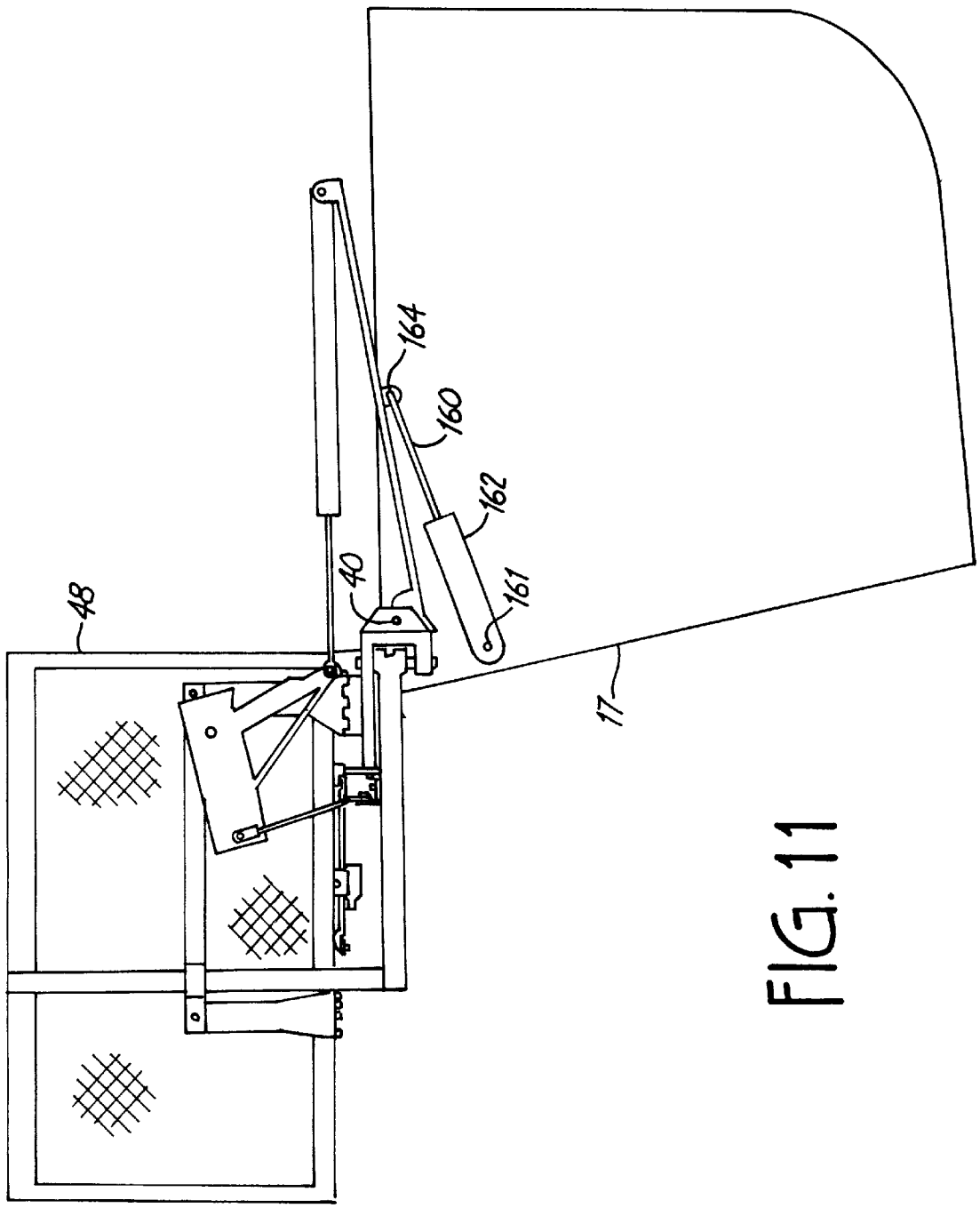
FIG. 11 shows a top cut away view of the present wheelchair lift being even further swung out of its receptacle by a second piston and cylinder mechanism where a wheelchair is rollable onto the platform in a direction parallel to the direction of travel of the vehicle.

FIG. 11 shows a second piston and cylinder or linear actuator mechanism that includes a piston 160 linearly extendible and retractable in a cylinder 162. Cylinder 162 is pivotally engaged via pivot pin 161 to the upper and lower plates 44 and 46 of the housing 17. Piston 160 is pivotally engaged via pivot pin 164 to swinging beam 38. Piston 160 and cylinder 162 swings the lift mechanism 30 out to a position where the wheelchair platform 48 generally parallel to the direction of travel of the vehicle 12. Lift mechanism 30 is openable in such parallel position to raise and lower wheelchair 16 and a person in the wheelchair 16 and to further swing from such parallel position via main pivot pin 40, with such wheelchair 16 and person, to the normal perpendicular position to open door 14 of van 12 such as shown in FIG. 8.

Figure 12A:
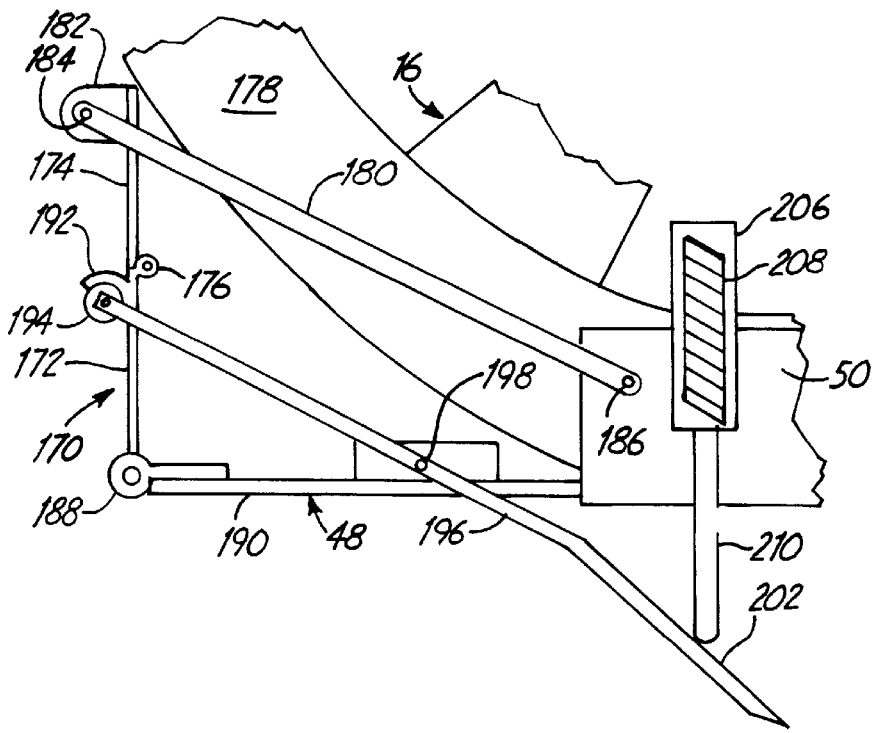
FIG. 12A is a schematic side view of a roll stop mechanism to prevent a wheelchair from rolling off the platform of the present wheelchair lift and shows the roll stop mechanism in its up position.
Figure 12B:
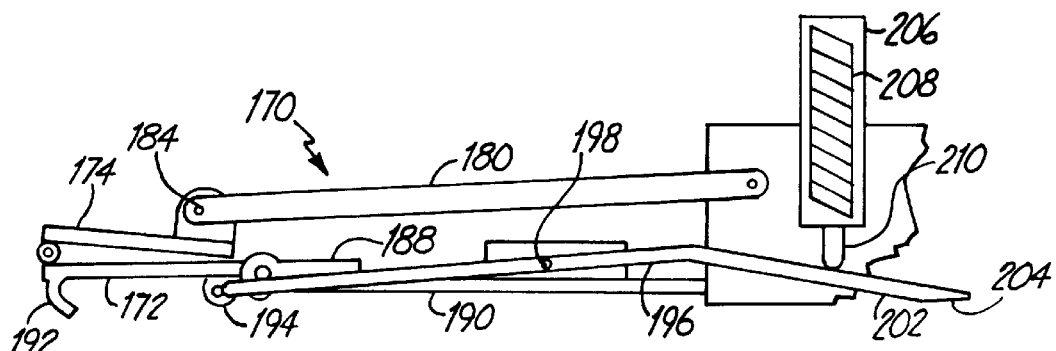
FIG. 12B is a schematic side view of the roll stop mechanism of FIG. 12A and shows the roll stop mechanism in its down position.
Figure 12C:
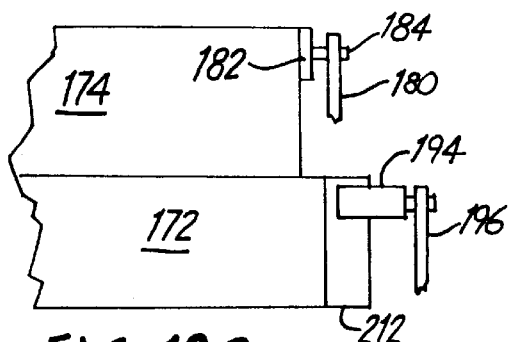
FIG. 12C is a schematic end view of a slightly different embodiment of the roll stop mechanism of FIG. 12A, with such embodiment of the roll stop mechanism being in its up position.
Figure 12D:
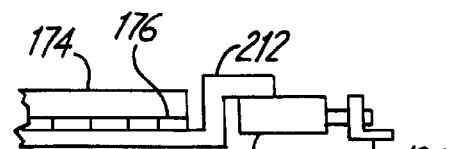
FIG. 12D is a schematic end view of the roll stop mechanism of FIG. 12C in its down position.
Figure 13:
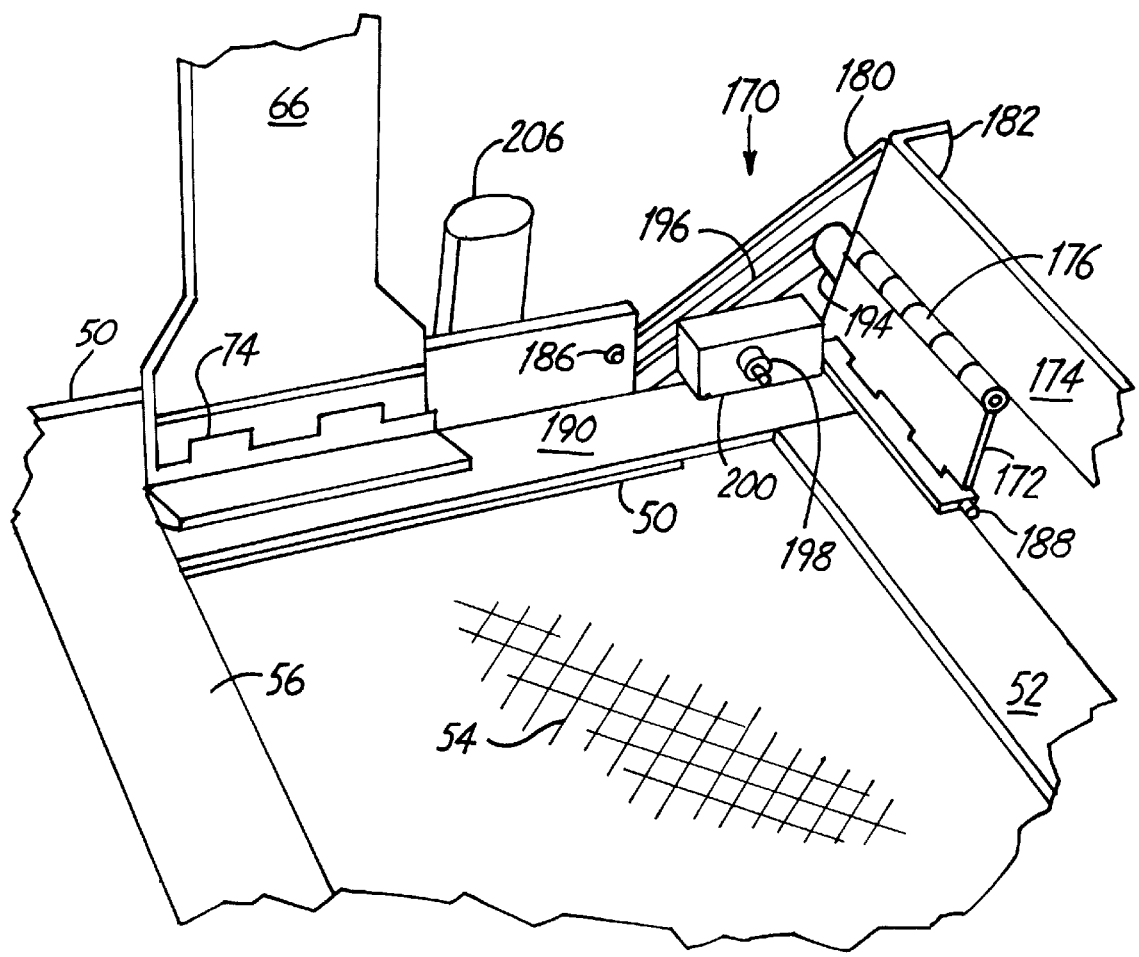
FIG. 13 is a perspective view of the roll stop mechanism of FIG. 12A.

FIGS. 12A, 12B, 12C, 12D and 13 show a safety roll stop 170 for an edge of the wheelchair platform 48. Safety roll stop 170 includes collapsible lower and upper end bars 172 and 174. Upper or top end bar 174 extends the width of the wheelchair platform 48. Lower bar 172 is preferably rather short, such as shown in FIG. 13 to minimize weight of the lift mechanism 30. Another lower bar 172 is fixed on the other side of wheelchair platform 48. Collapsible end bars 172 and 174 are hingedly engaged to each other by a hinge 176. When end bars 172 and 174 are upright, and with the hinge 176 mounted inwardly of the wheelchair platform 48, the upper edge of bar 172 and lower edge of bar 174 bring pressure to bear on each other and serve as stops relative to each other. In other words, end bars 172 and 174 act as one bar when pressure from a wheel 178 of a wheelchair 16 is outwardly exerted on upper bar 174.

An outward collapse of end bars 172 and 174 is prevented by an arm 180 pivotally engaged between top end bar 174 and angle iron 50. Top end bar 174 includes a bracket 182, which engages a pivot pin 184 connecting one end of arm 180. The other end of arm 180 is engaged via a pivot pin 186 to angle iron 50. Each end of top end bar 174 preferably includes arm 180.

Lower end bar 172 is hingedly engaged via a hinge 188 to a bar 190 welded to and extending from angle iron 50. Bar 190 is rigidly affixed, such as by welding, to end bar 52. At an upper portion, lower end bar 172 includes a curved tab roller stop 192. Lower end bar 172 is swingable outwardly relative to wheelchair platform 48, and such a swinging is controlled by a roller 194 on an end of an ground contactor arm or lever 196. Arm 96 is pivotally engaged at a medial portion via a pivot pin 198 to a block 200 rigidly fixed on bar 190. Arm 196 includes an integral bent portion 202 having a tapered ground contacting end 204. Bent portion 202 is normally biased downwardly via a linear actuator 206 where, in one embodiment, the linear actuator 206 includes a coil spring 208 and a plunger 210.

In operation, as shown in FIG. 12A, when the wheelchair platform 48 is off the ground, the coil spring 208 pushes the plunger 210 outwardly, which brings pressure to bear on arm bent portion 202, which in turn swings the roller 194 upwardly to roll against the outer face of lower bar 172 until it engages tab roller stop 192. An upward swinging of lower bar 172 draws or swings upper bar 174 to its upright position where bar 180, along with arm 196 and tab stop 192, prevent a further outward swinging of the end bars 172 and 174. When the wheelchair platform 48 is being lowered to reach the safe level of the ground, arm bent portion 202 is raised and the roller 194 swings outwardly, thereby permitting end bars 172 and 174 to collapse on top of each other under their own weight as shown in FIG. 12B, with the inner faces of the end bars 172 and 174 confronting each other, whereupon the wheelchair 16 may roll on or off the wheelchair platform 48 over the collapsed end bars 172 and 174.

FIGS. 12C and 12D indicate that lower end bar 172 may have its own track 212 for the roller 194. Tab stop 192 is omitted for clarity. Track 212 may be welded to lower bar 172. FIG. 12D indicates that arm or lever 196 may be an angle iron.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A wheelchair lift for a wheelchair and a person in the wheelchair, comprising:

a) a base;
 b) a platform for the wheelchair;
 c) a lift mechanism between the platform and the base, with the lift mechanism supporting the platform relative to the base, with the lift mechanism raising and lowering the platform from a first level to a second level, said lift mechanism including an arm fold link, said arm fold link pivotally mounted to said platform, said arm fold link pivotal down to said platform, in which said arm fold link is proximate said platform and in a general common plane therewith, said arm fold link pivotal to an upright operating position on said platform in which said arm fold link extends upright away from the platform wherein the lift mechanism can raise and lower the platform from the first level to the second level; and c) a first linear actuator between the lift mechanism and the base, with the first linear actuator drawing the platform to a storage configuration in the base and away from the base to an operating configuration, and with the linear actuator further operating the lift mechanism to raise and lower the platform from the first level to the second level.

2. The wheelchair lift according to claim 1, wherein the lift mechanism comprises at least four pivot points, with the four pivot points defining a parallelogram, with each of the four pivot points being on generally a horizontal axis, and with the four pivot points being on arms cooperating in the raising and lowering of the wheelchair platform.

3. The wheelchair lift according to claim 2, wherein the first linear actuator is pivotally connected to the lift mechanism at a point offset from each of said at least four pivot points.

4. The wheelchair lift according to claim 1 wherein the lift mechanism comprises an arm hingedly engaged to the platform and another arm hingedly engaged to the base, with the arms being drawable toward and away from the platform via such hinged engagement, and with the arms being generally on top of the platform when the lift mechanism is in its storage configuration.

5. The wheelchair lift according to claim 1 wherein the arm fold link comprises
i) a first arm hingedly engaged to the base, with the first arm being drawable onto the platform and drawable away from the platform to a position generally at a right angle relative to the platform;
ii) a second arm hingedly engaged to the platform, with the second arm being drawable onto the platform and drawable away from the platform to a position generally at a right angle relative to the platform;
iii) a third arm, with the third arm being engaged between the first and second arms and being pivotally engaged thereto; and
iv) a fourth arm, with the fourth arm being engaged between the platform and the base and being pivotally engaged thereto.

6. The wheelchair lift according to claim 1, and further comprising a lock between the platform and the base for locking the platform and lift mechanism with the base in the storage configuration.

7. The wheelchair lift according to claim 1, and further comprising a lock between a portion of the lift mechanism and the base for locking the lift mechanism and platform with the base in the storage configuration.

8. The wheelchair lift according to claim 1, wherein the first linear actuator includes a member linearly drawable toward and away from the linear actuator.

9. The wheelchair lift according to claim 1 and further comprising, in combination, a vehicle having an underside and a drive shaft longitudinally splitting the underside, and wherein the base comprises a receptacle for the lift mechanism and into which the lift mechanism is drawable, with the receptacle being mounted on the underside of the vehicle on one side of the drive shaft.

10. The wheelchair lift according to claim 1 and further comprising a second linear actuator, with the second linear actuator being engaged between the base and the first linear actuator for drawing the first linear actuator to and away from the base to thereby provide a further range to of motion when the platform is drawn to and away from the base.

11. A safety roll stop for an edge of a wheelchair lift platform for a wheelchair, comprising:
a) a bar swingably engaged to the edge of the wheelchair platform and being swingable to a lowered position where the wheelchair may roll on and off the platform and to a raised position to prevent the wheelchair from rolling off the platform;
b) an arm having first and second end portions, with the first end portion having a roller and with the second end portion being contactable with a surface for the wheelchair, with the arm being pivotally engaged to the wheelchair platform between the end portions, with the roller running on a portion of the bar between raised and lowered locations to draw the bar to the raised position when the roller runs to the raised location and to permit the bar to swing to the lowered position when the roller runs to the lowered location; and
c) an actuator on the wheelchair platform and engaging the second end portion, with the actuator bringing pressure to bear on the second end portion of the arm and biasing the second end portion of the arm toward the surface such that the roller is biased to run to the raised location and thereby raise the bar to stop the roll of the wheelchair and such that, when the wheelchair platform is lowered into contact with the surface, the surface pushes the second end portion against the actuator and draws the roller to the lowered location to permit the bar to swing to the lowered position to permit the wheelchair to roll off the platform.

12. The safety roll stop according to claim 11 wherein the bar comprises:
a) first member having an inner face facing the wheelchair platform and an outer face facing away from the wheelchair platform, with the first member being swingably engaged to the edge of the wheelchair platform; and
b) a second member having an inner face facing the wheelchair platform and an out face facing away from the wheelchair platform, with the second member being swingably engaged on the first member such that the inner faces of the members are collapsible generally on top of each other.

13. The safety roll stop according to claim 12 and further comprising a support arm between the second member and the wheelchair platform, with the support arm being pivotally engaged to the second member and pivotally engaged to the wheelchair platform to permit the support arm to swing when the second member swings relative to the first member.

14. A wheelchair lift for a wheelchair and a person in the wheelchair, comprising:
a) abase;
b) a platform for the wheelchair, with the platform comprising a safety roll stop for an edge of the platform, with the safety roll stop comprising:
i) a bar swingably engaged to the edge of the wheelchair platform and being swingable to a lowered position in which the wheelchair may roll on and off the platform and to a raised position to prevent the wheelchair from rolling off the platform;
ii) an arm having first and second end portions, with the first end portion having a roller and with the second end portion being contactable with a surface for the wheelchair, with the arm being pivotally engaged to the wheelchair platform between the end portions, with the roller running on a portion of the bar between raised and lowered locations to draw the bar to the raised position when the roller runs to the raised location and to permit the bar to swing to the lowered position when the roller runs to the lowered location; and iii) an actuator on the wheelchair platform and engaging the second end portion, with the actuator bringing pressure to bear on the second end portion of the arm and biasing the second end portion of the arm toward the surface such that the roller is biased to run to the raised location and thereby raise the bar to stop the roll of the wheelchair and such that, when the wheelchair platform is lowered into contact with the surface, the surface pushes the second end portion against the actuator and draws the roller to the lowered location to permit the bar to swing to the lowered position to permit the wheelchair to roll off the platform;

c) a lift mechanism between the platform and the base, with the lift mechanism supporting the platform relative to the base, with the lift mechanism raising and lowering the platform from a first level to a second level, with the lift mechanism being drawable onto the platform to a storage configuration and drawable away from the platform to an operating configuration in which the lift mechanism raises and lowers the platform from the first level to the second level; and d) a first linear actuator between the lift mechanism and the base, with the first linear actuator drawing the platform to the base and away from the base, and with the linear actuator further operating the lift mechanism to raise and lower the platform from the first level to the second level.

\* \* \* \* \*